Oct. 13, 1936.  S. C. LYONS  2,057,156
METHOD OF AND APPARATUS FOR SEPARATING SOLIDS FROM FLUID SUSPENSION
Filed Sept. 20, 1934
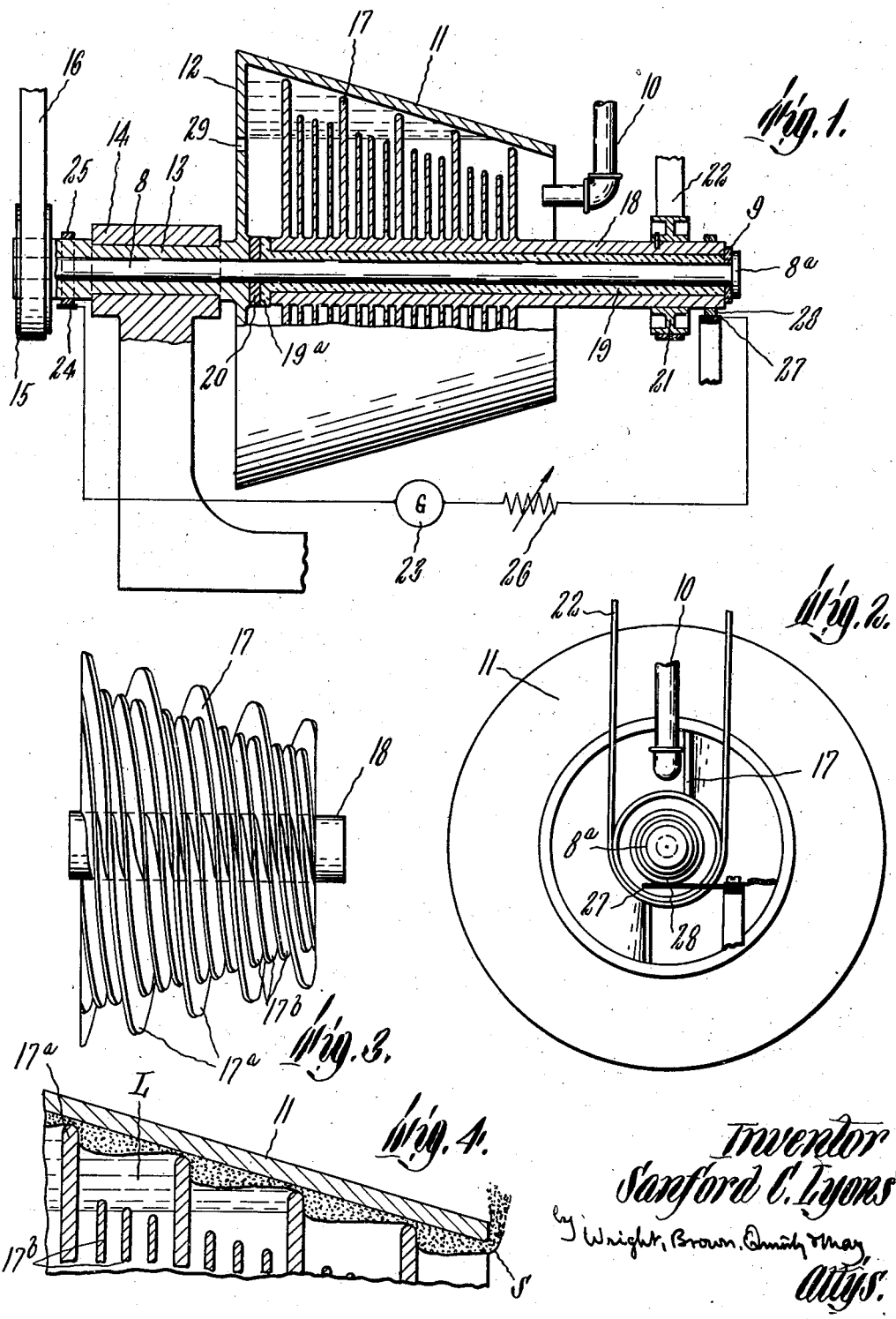
Inventor
Sanford C. Lyons
by Wright, Brown, Quinby & May
Attys.

Patented Oct. 13, 1936

2,057,156

UNITED STATES PATENT OFFICE 2,057,156

METHOD OF AND APPARATUS FOR SEPARATING SOLIDS FROM FLUID SUSPENSION

Sanford C. Lyons, Bennington, Vt., assignor to Bird Machine Co., Walpole, Mass., a corporation of Massachusetts Application September 20, 1934, Serial No. 744,759

8 Claims. (Cl. 233—1)

This invention relates to a method of and apparatus for separating solids from fluid suspension. It deals more particularly with the separation of solids suspended in such finely divided state in the fluid suspension medium that separation of the solids by gravitational settling is impracticable, if not impossible.

In conditioning clay for such uses as filling or coating papers, there is produced an aqueous suspension or dispersion of clay of the kind already mentioned. The conditioning process generally involves suspending the clay in water to form an aqueous slurry from which such coarse particles as silica, mica, etc., are substantially completely removed as by riffling. Inasmuch as the clay particles are exceedingly fine, the separation of such particles by settling is altogether too slow to be useful. Indeed, a substantial fraction of the clay particles may have a fineness in the order of magnitude of about one micron, wherefore, the clay suspension may exhibit violent Brownian movement. Heretofore, the practice has been to recover the clay particles from aqueous suspension by adding thereto a suitable flocculating agent, e. g., alum, and then filtering out the clay flocs or agglomerates in suitable filter presses. The collections or cakes of moist clay are then removed from the presses and dried.

While it is possible to dewater clay and other aqueous suspensions to some extent by centrifugation, nevertheless, such practice is not commercially feasible for the reason that the rate and/or extent to which dewatering can be carried in practicable centrifugal machines falls far short of that required. It is also known that clay may be collected by electrodeposition from aqueous suspension on an anode, but this practice offers little, if any, advantage over the usual practice of filtration when one takes into consideration the installation and maintenance costs of the equipment and more especially the large amount of electrical energy necessary for dewatering a given amount of aqueous clay suspension.

In accordance with the present invention, finely divided solids, more particularly of a character exhibiting electrophoresis or electro-osmosis in fluid suspension, are separated from suspension by subjecting the suspension to centrifugation under conditions tending to deposit such solids on the centrifugal wall while impressing the wall during centrifugation with an electric charge tending to attract the solids and thereby to accelerate the deposition of the solids thereon. Such a practice is not only advantageous by reason of the fact that it enables the use of a centrifuge in separating with high efficiency solids from fluid suspension or dispersion, but further because it makes possible a highly satisfactory and practicable application of a centrifuge in the treatment of suspensions that could not heretofore be so treated practicably. Thus, by applying the principles of the present invention, it becomes possible to recover clay from aqueous suspension or dispersion at such high solids content and/or rate as to be of decided commercial attractiveness. A major feature of the practice of my invention is that it may be performed continuously and controllably and, accordingly, be made to yield substantially uniform and reproducible results. Thus, the suspension may be progressively delivered into a centrifuge whose wall is electrically charged, as hereinbefore described, while the solids depositing on the wall are being progressively removed from the centrifuge and while fluid accumulating inwardly of the solids deposit is also being progressively removed from the centrifuge. The removal of the solids deposit may be readily effected through one end of the centrifuge and the removal of fluid through the other end, the solids deposit being propelled or positively forced through one end of the centrifuge and the fluid being emitted through the other end. The means for propelling or forcing the solids deposit out of the centrifuge is impressed with an electric charge opposite to that carried by the centrifuge wall and is electro-insulated from the wall, thereby placing the particles in suspension under coacting electrical and mechanical forces tending to deposit them on the wall.

With the foregoing and other features and objects in view, I shall now describe my invention in greater detail with reference to the accompanying drawing, wherein,—

Figure 1 represents a longitudinal view, largely sectional, of apparatus embodying my invention.

Figure 2 is an end view of the apparatus.

Figure 3 is a front elevation of the solids-propelling element with which the centrifuge is equipped.

Figure 4 is a fragmentary section through the apparatus illustrating the action of the propelling element on the layer of solids depositing on the centrifuge wall.

While not restricted thereto, I shall now describe my invention specifically in terms of the treatment of an aqueous slurry of clay from which coarse impurities, such as sand, mica, etc., have been substantially completely removed as usual. A clay slurry of this kind may have a solids content of about 15% to 20%, at which solids content it flows readily and can hence be piped, pumped, and otherwise handled like a liquid. In some instances the clay slurry may be at a solids content of as low as about 5% or as high as about 35%.

In the case of clay slurry of high solids content, it may be desirable to have present therein a suitable dispersing agent, such as sodium silicate, to render the slurry less viscous than it would otherwise be and also to enhance the rate of deposition of solids therefrom in the course of practice of my invention. The slurry may, as shown in Figure 1, be delivered through a pipe 10 discharging into a centrifuge 11 of the horizontal, continuous flow type. The centrifuge illustrated is a frusto-conical shell whose large diameter end is closed off by an end plate 12 and whose small diameter end is open. Discharge of the slurry into the centrifuge is preferably effected near its open end.

The centrifuge is shown as including a trunnion 13 projecting from its end plate 12 and journalled for rotation in a bearing 14. The trunnion may project beyond the bearing and have a pulley 15 affixed thereto, the pulley being driven by a belt 16 from a suitable source of power (not shown). Passing through the hollow of the trunnion and continuing axially through the centrifuge and beyond its open end is shown an arbor 8 which serves as the support for the means for propelling or forcing the solids deposit out through the open end. The propelling or forcing means may to advantage assume the form of a worm or screw 17, as best shown in Figure 3, whose shaft 18 is hollow and is supported for rotation on an electro-insulating sleeve 19 fixed to the arbor 8. The worm or screw 17 illustrated comprises widely spaced spiral turns or convolutions 17a of progressively diminishing radius toward the open end of the centrifuge and barely clearing the centrifuge wall, the spaces in between the spiral turns 17a being occupied by closely spaced spiral turns 17b of progressively diminishing radius toward the open end of the centrifuge but clearing the centrifuge wall by a considerable gap. The worm may be driven as by a pulley 21 keyed or otherwise secured to the shaft 18 and deriving its motive power through the belt 22 from a suitable source (not shown). Both the centrifuge and the worm are rotated in the same direction, as indicated in Figure 2, but the speed of rotation of the worm is greater than that of the centrifuge so as to cause the desired propulsion or feed of the clay solids depositing on the wall of the centrifuge out through the open end of the centrifuge, as will hereinafter appear in greater detail.

The function of the electro-insulating sleeve 19 is to prevent electrical contact between the worm and the centrifuge and thus to permit the centrifuge to be impressed with a positive electrical charge that will attract thereto the clay particles and to permit the worm to be impressed with the negative electrical charge that will repel the clay particles therefrom. The inner end portion of the sleeve 19 preferably includes a flange 19a that bears against an electro-insulating thrust washer 20 located in between the flange and the end plate 12 and serving to prevent electrical contact between the worm and the end plate. An electro-insulating washer 9 is preferably also located on the arbor 8 at the outer end of the sleeve 19, the end portion of the arbor being enlarged to form a flange 8a in sliding engagement over the washer.

A direct current generator 23 is provided to supply the electric current, the positive pole of the generator being wired to a brush 24 that makes contact with a ring 25 fixed to the trunnion 13 and the negative pole of the generator being wired through a rheostat 26 or other variable resistance to a brush 27 that makes contact with a ring 28 fixed to the worm shaft 18.

I shall now describe the action which the clay slurry undergoes in the centrifuge. As the slurry is being progressively delivered into the centrifuge, it is impelled by centrifugal force against the wall of the centrifuge, tending to accumulate as an annular layer of progressively diminishing thickness or depth toward the open end of the centrifuge. The centrifugal force at work on the clay particles functions cumulatively with the electrical attraction exerted by the centrifuge wall so as to cause such particles to migrate rapidly toward the wall, and, as best shown in Figure 4, to deposit as a layer of solids or concentrated paste S next to the centrifuge wall, whereas an aqueous medium L of depleted solids content is developed as an inner layer. The end plate 12 has an annular opening 29 therethrough through which the aqueous medium L may progressively escape, such opening being sufficiently outwardly offset relative to the small diameter end of the centrifuge so that the inner face of the layer is well within the open end of the centrifuge, as best shown in Figure 1, and hence does not tend to escape through such open end. The layer of solids or concentrated paste S is progressively propelled or forced out through the open end of the centrifuge. The liquid medium escaping through the large diameter end and the concentrated paste discharged at the small diameter end may be caught in suitable separate receivers. The paste may then be dried, if desired, in any suitable manner.

An important advantage realized by the continuous practice described is that the centrifuge wall is constantly maintained as a highly effective anode, since solids depositing thereon are not permitted to build up to a depth such that they would exercise a marked electro-insulating effect and thus impair seriously the electrical pull exerted by the wall on the clay particles in suspension. It is for this reason that the worm includes, as already indicated, the turns 17a which preferably clear the centrifuge wall only sufficiently to avoid electrical contact therewith.

While the practice of my invention may be applied to various fluid suspensions, it is of especial utility as applied to suspensions of solids of extremely fine or colloidal particle size such as aqueous suspensions of china clay. Thus, the particles of china clay are so fine that when aqueous suspensions thereof are subjected to centrifugation, the separation or concentration of solids that takes place is relatively small owing to the extremely low weight of the china clay particles. Moreover, the turbulence prevailing in a centrifuge does not conduce to flocculation or agglomeration of the clay particles such as would, of course, promote a separation of such particles. By employing the principles of the present invention, on the other hand, it becomes possible to concentrate aqueous china clay suspensions to a solids content of as high as about 65% to 70%, as the electrophoretic or electro-osmotic action brought into play is dependent upon the fineness of particle size (i. e., increases with increase of surface per unit mass) and upon the voltage impressed upon the centrifuge wall. Other important advantages are gained by the practice of my invention including the following:

(1) the adhesion of the particles to the centrifuge wall under the influence of moderately high voltages in the neighborhood of, say, 110 to 210 volts is considerable and tends to prevent re-suspension on account of turbulence or swirling of fresh suspension being delivered into the centrifuge, and substantial similar effect is realized at even much lower voltages;

(2) the particles of the suspension, especially china clay particles, tend to become strongly flocculated with the result that rapid deposition of solids tends to take place on the centrifuge wall;

(3) the centrifuge wall tends to repel the aqueous medium, in consequence of which the solids depositing on the centrifuge wall undergo a greater degree of dewatering;

(4) the layer of solids or thick paste deposited on the centrifuge wall, which in the case of china clay is more or less plastic and sticky, does not tend to stick to or "gum" the worm or screw, as such latter element being the cathode tends to attract and retain a lubricating film of water thereon that prevents such sticking or "gumming" action;

(5) under the conditions of practice of my invention, consumption of electrical energy is far less than when electrophoresis alone is relied upon for the separation of the solids, thereby markedly reducing cost of operation.

While I have described a particular and advantageous form of apparatus for the practice of my invention, it will be appreciated that I might employ therefor other forms of apparatus such as are suitable for batch or intermittent operation as well as for continuous operation, including vertical forms of centrifuges. The present invention extends to the treatment of fluid suspensions or dispersions of various solids exhibiting electrophoresis, including solids that carry a positive charge when suspended in finely divided or colloidal state in a fluid medium, in which latter case the centrifuge wall should be negatively charged. Most of the fluid suspensions or dispersions with which I am familiar, however, including fluid suspensions or dispersions of cellulose, rubber, and other organic and inorganic solids, such as cement and slag slurries, are ones wherein the suspended or dispersed phase carries a negative electrical charge, as does an aqueous suspension or slurry of clay.

In some instances, it may be desirable to tip the peripheral or propelling edges or edge portions of the turns or convolutions 17a of the worm 17 with a suitable electro-insulating material, preferably a resilient material, such as rubber, for the purpose of minimizing the tendency of the deposited solids to stick to the worm, thereby promoting a clean condition on such propelling edges or edge portions at all times. Such tipping of the propelling edges or edge portions of the worm may further be advantageous in that vibration tending to bring such propelling edges or edge portions into contact with the centrifuge wall will not cause even momentary short-circuiting of the apparatus.

I claim:—

1. Apparatus of the class described comprising in combination a centrifuge, means for progressively delivering a fluid suspension of finely divided solids into said centrifuge, means for progressively removing solids depositing as a layer onto the wall of said centrifuge, means for progressively removing from the centrifuge fluid accumulating inwardly of said layer of solids, and means for impressing said centrifuge wall with an electrical charge tending to attract said solids thereto and for impressing said solids-removing means with an opposite electrical charge, said solids-removing means being electro-insulated from said centrifuge wall, and maintaining said wall at high effectiveness in attracting said suspended solids thereto.

2. Apparatus of the class described comprising in combination a centrifuge of frusto-conical shape whose axis lies substantially in a horizontal plane, means for progressively delivering a fluid suspension of finely divided solids into said centrifuge adjacent to its small diameter end, means for progressively removing through the small diameter end solids depositing as a layer on the wall of said centrifuge, means for progressively removing through the large diameter end fluid accumulating inwardly of said layer of solids, and means for impressing said centrifuge wall with an electrical charge tending to attract said solids thereto and for impressing said solids-removing means with an opposite electrical charge, said solids-removing means being electro-insulated from said centrifuge wall and maintaining said wall at high effectiveness in attracting suspended solids thereto.

3. In a method of separating and recovering from fluid suspension, as a solids concentrate, finely divided solids exhibiting electrophoresis, that combination of steps which comprises progressively feeding said suspension into a centrifuge tending to deposit said solids on the centrifuge wall as a solids concentrate layer and to accumulate the fluid as a layer inwardly of and bounding said concentrate layer, impressing said wall during centrifugation with an electric charge tending to attract said solids and thereby to accelerate the deposition of said solids thereon, and freeing said wall sufficiently from solids as they are being deposited thereon to avoid substantial impairment of the electro-attractive force exercised thereby on said suspended solids while maintaining and recovering the solids freed from said wall as a solids concentrate of markedly higher solids content than that of the suspension being fed.

4. In a method of separating and recovering from fluid suspension, as a solids concentrate, finely divided solids exhibiting electrophoresis, that combination of steps which comprises progressively feeding said suspension into a centrifuge tending to deposit said solids on the centrifuge wall as a solids concentrate layer and to accumulate the fluid as a layer inwardly of and bounding said concentrate layer, impressing said wall during centrifugation with an electric charge tending to attract said solids and thereby to accelerate the deposition of said solids thereon, progressively removing from the centrifuge solids as they are being deposited on said wall at a rate to avoid substantial impairment of the electro-attractive force exercised by said wall on said suspended solids while maintaining and recovering said removed solids as a solids concentrate of markedly higher solids content than that of the suspension being fed, and progressively removing from the centrifuge fluid accumulating in said fluid layer at a solids content lower than of the suspension being fed.

5. In a method of separating and recovering from liquid suspension, as a solids concentrate, finely divided solids exhibiting electrophoresis, that combination of steps which comprises continuously streaming said suspension into a drum centrifuge tending to deposit said solids on the centrifuge wall as an annular solids concentrate layer and to accumulate the liquid as an annular layer inwardly of and bounding said concentrate layer, impressing said wall during centrifugation with an electric charge tending to attract said solids and thereby to accelerate the deposition of said solids thereon, continuously discharging from the centrifuge solids depositing on the wall thereof at a rate to avoid substantial impairment of the electro-attractive force exercised by said wall on said suspended solids while maintaining and recovering said discharged solids as a solids concentrate of markedly higher solids content than that of the suspension being fed, and continuously and separately discharging as a stream from the centrifuge the liquid accumulating in said annular liquid layer at a solids content lower than that of the suspension being fed.

6. In a method of separating and recovering from aqueous suspension, as a solids concentrate, clay particles exhibiting electrophoresis, that combination of steps which comprises progressively feeding said suspension into a drum centrifuge tending to deposit said particles on the centrifuge wall as an annular solids concentrate layer and to accumulate the aqueous medium as an annular layer inwardly of and bounding said concentrate layer, impressing said wall during centrifugation with a positive electrical charge tending to attract said particles and thereby to accelerate the deposition of said particles thereon, progressively propelling out of the centrifuge solids from said solids concentrate layer at a rate to avoid substantial impairment of the electro-attractive force exercised by said wall on said suspended solids while maintaining and recovering said solids as a solids concentrate of markedly higher solids content than that of the suspension being fed, and progressively emitting from the centrifuge the aqueous medium accumulating in said annular aqueous medium layer at a solids content lower than that of the suspension being fed.

7. In a practice of bringing about separation and recovery, as a solids concentrate, of finely divided solids exhibiting electrophoresis from fluid suspension by the use of a centrifuge, that combination of steps which comprises centrifuging said suspension while impressing the wall of the centrifuge with an electric charge cooperating with centrifugal force in effecting deposition of said solids on said wall as a solids concentrate layer and accumulation of fluid as a layer inwardly of and bounding said concentrate layer; and, in the course of said centrifuging operation, clearing said wall sufficiently of deposited solids to maintain at high effectiveness the electro-attractive force exercised by said wall on said suspended solids while maintaining and recovering said cleared solids as a solids concentrate of markedly higher solids content than that of the original suspension.

8. In a practice of bringing about separation and recovery, as a solids concentrate, of fine clay particles suspended in water and exhibiting electrophoresis by the use of a centrifuge, that combination of steps which comprises centrifuging said clay suspension while impressing the wall of the centrifuge with an electric charge cooperating with centrifugal force in effecting deposition of clay solids on said wall as a solids concentrate layer and accumulation of aqueous medium as a layer inwardly of and bounding said concentrate layer; and, in the course of said centrifuging operation, substantially continuously removing solids from said concentrate layer as it is being formed on said wall to maintain the electro-attractive force exercised by said wall on said suspended solids at high effectiveness throughout the centrifuging operation while maintaining and recovering said removed solids as a concentrate of much higher solids content, up to about 70%, than that of the original aqueous clay suspension.

SANFORD C. LYONS.